(12) United States Patent
Kim

(10) Patent No.: US 9,346,416 B1
(45) Date of Patent: May 24, 2016

(54) VEHICLE CARGO LINER ASSEMBLY

(71) Applicant: Kevin Keun Kim, Mississauga (CA)

(72) Inventor: Kevin Keun Kim, Mississauga (CA)

( * ) Notice: Subject to any disclaimer, the term of this patent is extended or adjusted under 35 U.S.C. 154(b) by 0 days.

(21) Appl. No.: 14/555,760

(22) Filed: Nov. 28, 2014

(51) Int. Cl.
| | |
|---|---|
| *B60R 13/01* | (2006.01) |
| *B60R 9/06* | (2006.01) |
| *B60P 7/14* | (2006.01) |
| *B60J 7/14* | (2006.01) |

(52) U.S. Cl.
CPC ............... *B60R 13/01* (2013.01); *B60J 7/141* (2013.01); *B60P 7/14* (2013.01); *B60R 9/06* (2013.01); *B60R 2013/016* (2013.01)

(58) Field of Classification Search
CPC .... B60R 13/01; B60R 9/06; B60R 2013/016; B60J 7/141; B60P 7/14
USPC .............................................. 296/39.1, 39.2
See application file for complete search history.

(56) References Cited

U.S. PATENT DOCUMENTS

| | | | |
|---|---|---|---|
| 4,394,100 A | 7/1983 | Sperlich | |
| 4,615,557 A | 10/1986 | Robinson | |
| 4,828,312 A | 5/1989 | Kinkel et al. | |
| 5,232,259 A | 8/1993 | Booker | |
| 6,039,379 A | 3/2000 | Jordan | |
| 6,076,881 A | 6/2000 | Tucker | |
| 6,135,527 A * | 10/2000 | Bily | B60R 7/02 296/24.4 |
| 6,507,701 B2 | 1/2003 | Lake | |
| 6,648,398 B2 * | 11/2003 | Duffy | B60P 3/39 16/290 |
| 6,676,174 B2 | 1/2004 | Reynolds et al. | |
| 6,799,784 B2 | 10/2004 | Rios | |
| 7,017,977 B1 * | 3/2006 | Kelter | B62D 33/0273 296/182.1 |
| 7,290,820 B1 * | 11/2007 | Smith | B60R 11/00 296/37.6 |
| 8,215,693 B2 * | 7/2012 | Ulita | B60R 5/04 296/37.1 |
| 9,132,786 B2 * | 9/2015 | Roach | B60R 9/065 |

FOREIGN PATENT DOCUMENTS

| | | |
|---|---|---|
| CA | 1296596 | 3/1992 |
| CA | 2165153 | 6/1996 |
| CA | 2630266 | 11/2009 |

* cited by examiner

*Primary Examiner* — Jason S Morrow
*Assistant Examiner* — E Turner Hicks
(74) *Attorney, Agent, or Firm* — Giuseppe Mariconda

(57) ABSTRACT

An apparatus is for a vehicle having a vehicle section. The apparatus includes a vehicle cargo liner assembly configured to be received in the vehicle section of the vehicle, and the vehicle cargo liner assembly having oppositely-facing liner side walls. The apparatus also includes a movable liner panel pivotally mountable to the oppositely-facing liner side walls in such a way that the movable liner panel is pivotally movable, at least in part, between a panel-storage position and a panel-deployed position.

12 Claims, 14 Drawing Sheets

108

110

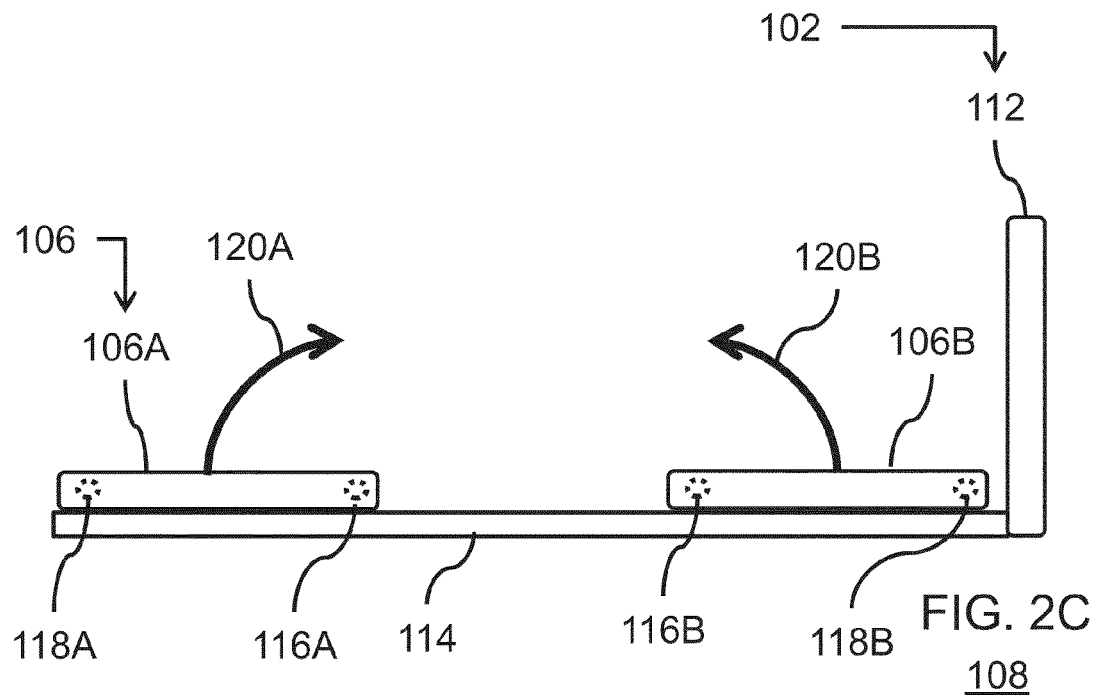
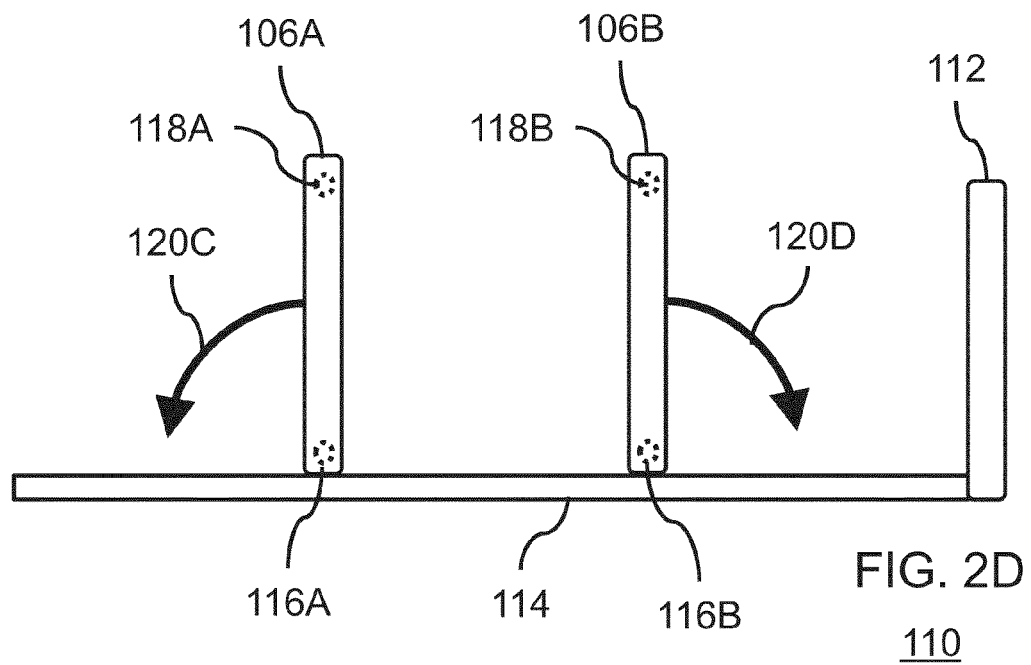

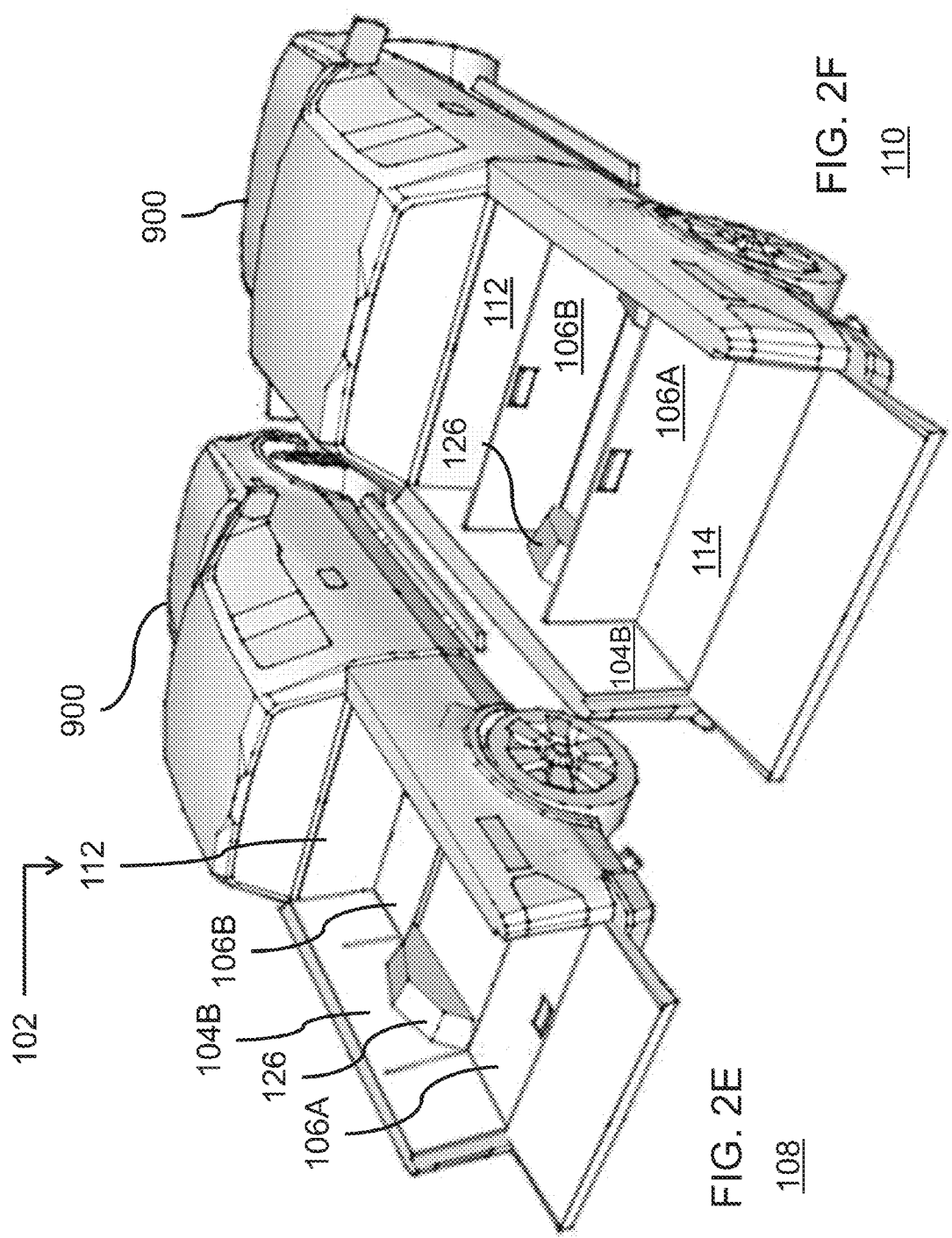

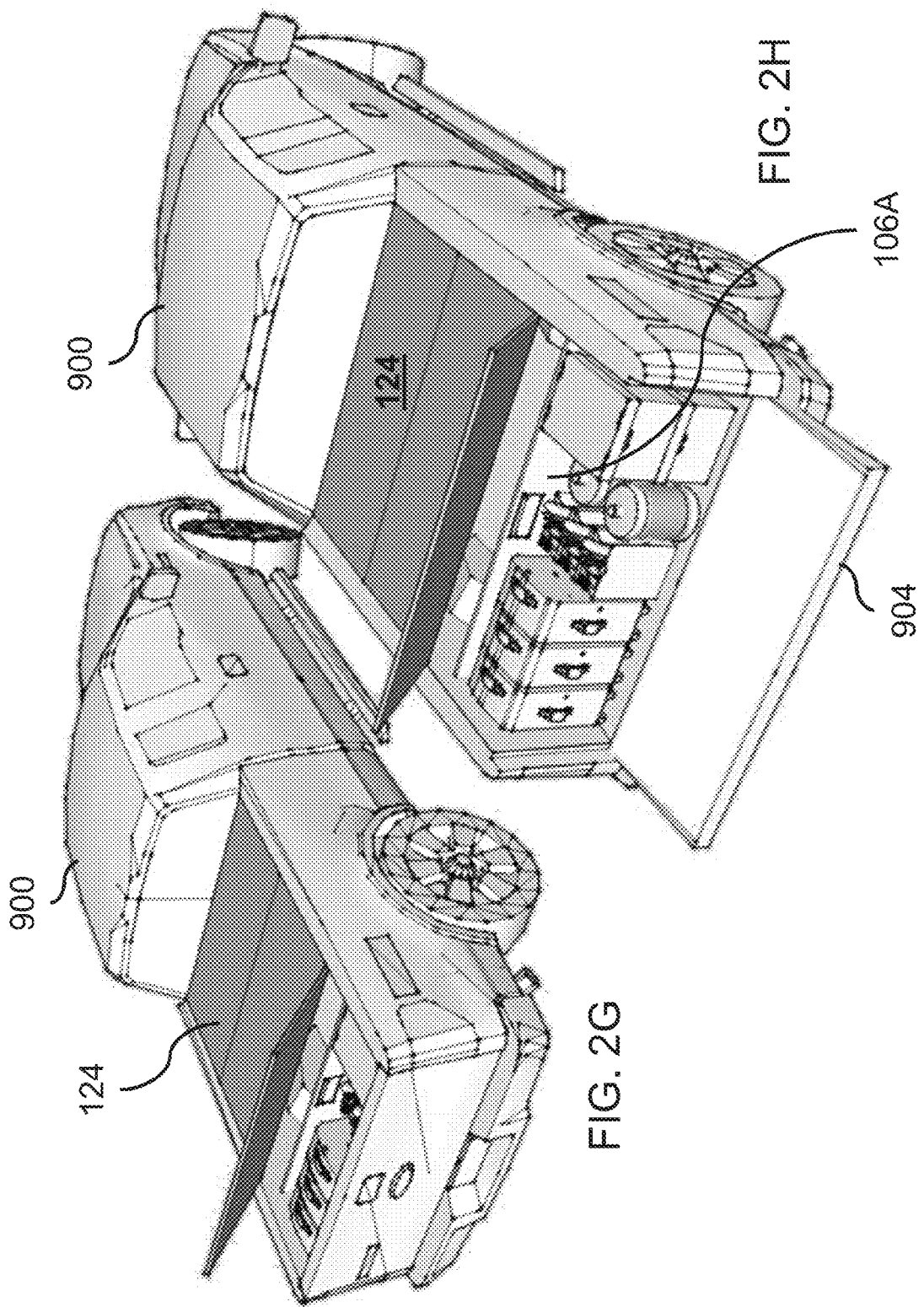

108

110

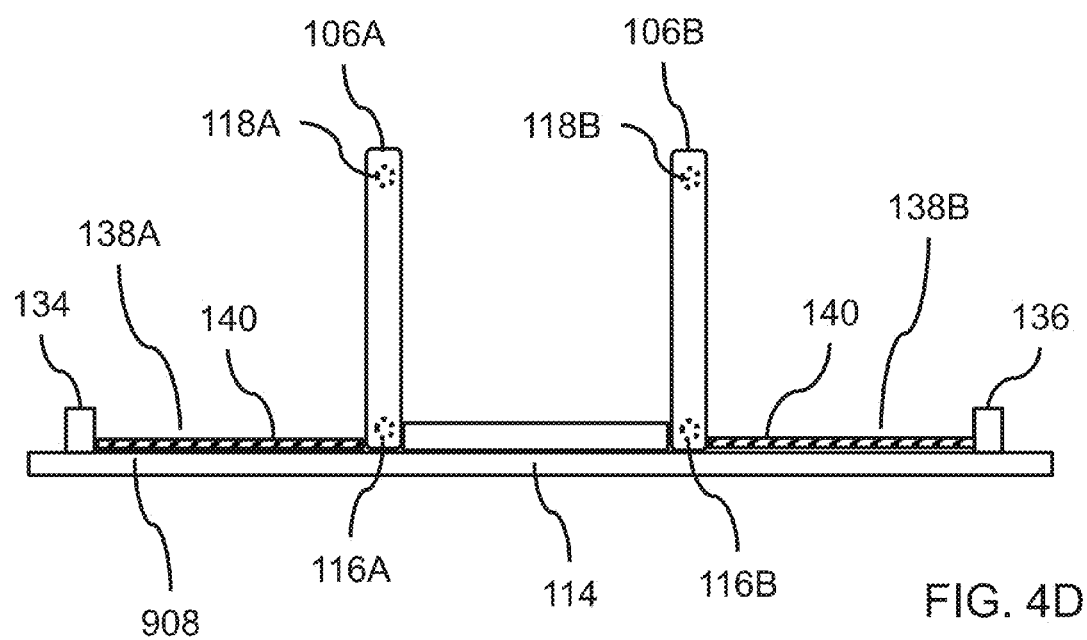

108

110

VEHICLE CARGO LINER ASSEMBLY

TECHNICAL FIELD

Some aspects generally relate to (and are not limited to) and apparatus (and method therefor). The apparatus includes a vehicle cargo liner assembly and a movable liner panel mountable to the vehicle cargo liner assembly.

BACKGROUND

Truck-bed liners (cargo liners) provide a protective coating (liner) configured to shield (at least in part) the inner-side of a truck bed from damage, and to provide a skid resistant surface allowing cargo to stay in place, depending on circumstances. There are two broad classifications of bed liners: (A) the drop-in type, and (B) the Spray on or in type. The drop-in type bed liner is applied (dropped) to the truck bed, and may be removed for cleaning. The spray-in type bed liner requires specific preparation to allow the coating to adhere correctly to the truck bed, and the better the coating may adhere can determine the length of life for the coating once applied to the truck bed.

When applied correctly, the value of the drop-in type bed liner is that it resists denting and scratching and holds shape firmly yet is flexible enough to not crack when the truck navigates through rough terrain, etc. Unlike a metal bed of the truck, the drop-in type bed liner is configured to absorb vibration to protect the cargo stored in or on the drop-in type bed liner. Whereas the painted metal of the metal bed of the truck will chip and rust under rough conditions, polyurethane coatings (and any equivalent thereof) associated with the drop-in type bed liner is configured to prevent, at least in part, damage from scratching and most chemicals and therefore avoid (reduce) rusting.

SUMMARY

It will be appreciated there exists a need to mitigate (at least in part) at least one problem associated with vehicle cargo liners. After much study of the known systems and methods with experimentation, an understanding of the problem and its solution has been identified and is articulated as follows:

Existing drop-in type truck-bed liners (cargo liners) do not facilitate a better way to allow cargo to stay in place. When the truck is driven over rough terrain, the cargo placed in the drop-in type truck-bed liner may inadvertently shift and become damaged. What is needed is a mechanism to reduce the possibility of inadvertent shifting of the cargo once the cargo is received on the truck-bed liner.

To mitigate, at least in part, at least one problem associated with existing vehicle cargo liners, there is provided (in accordance with a major aspect) an apparatus. The apparatus is for a vehicle having a vehicle section. The apparatus includes (and is not limited to) a vehicle cargo liner assembly configured to be received in the vehicle section of the vehicle. The vehicle cargo liner assembly has oppositely-facing liner side walls. The apparatus also includes a movable liner panel pivotally mountable to the oppositely-facing liner side walls. This is done in such a way that the movable liner panel is pivotally movable, at least in part, between a panel-storage position and a panel-deployed position.

To mitigate, at least in part, at least one problem associated with existing vehicle cargo liners, there is provided (in accordance with a major aspect) an apparatus. The apparatus includes (and is not limited to) a vehicle, a vehicle cargo liner assembly, and a movable liner panel. The vehicle has a vehicle section. The vehicle cargo liner assembly is configured to be received in the vehicle section of the vehicle. The vehicle cargo liner assembly has oppositely-facing liner side walls. The movable liner panel is pivotally mountable to the oppositely-facing liner side walls. This is done in such a way that the movable liner panel is pivotally movable, at least in part, between a panel-storage position and a panel-deployed position.

To mitigate, at least in part, at least one problem associated with existing vehicle cargo liners, there is provided (in accordance with a major aspect) a method. The method is for a vehicle having a vehicle section. The method includes (and is not limited to) a providing operation, including providing a vehicle cargo liner assembly configured to be received in the vehicle section of the vehicle, in which the vehicle cargo liner assembly has oppositely-facing liner side walls. The method also includes a mounting operation, including pivotally mounting a movable liner panel pivotally to the oppositely-facing liner side walls. This is done in such a way that the movable liner panel is pivotally movable, at least in part, between a panel-storage position and a panel-deployed position.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIGS. 2A, 2B, 2B-1, 2C, 2D, 2E, 2F, 2G and 2H (SHEETS 2 to 6 of 14 SHEETS) depict views of embodiments of the apparatus 100 of FIG. 1;

FIGS. 4A, 4B, 4C, 4D, 4E, 4F and 4G (SHEETS 10 to 14 of 14 SHEETS) depict views of embodiments of the apparatus 100 of FIG. 1.

Figure 1:
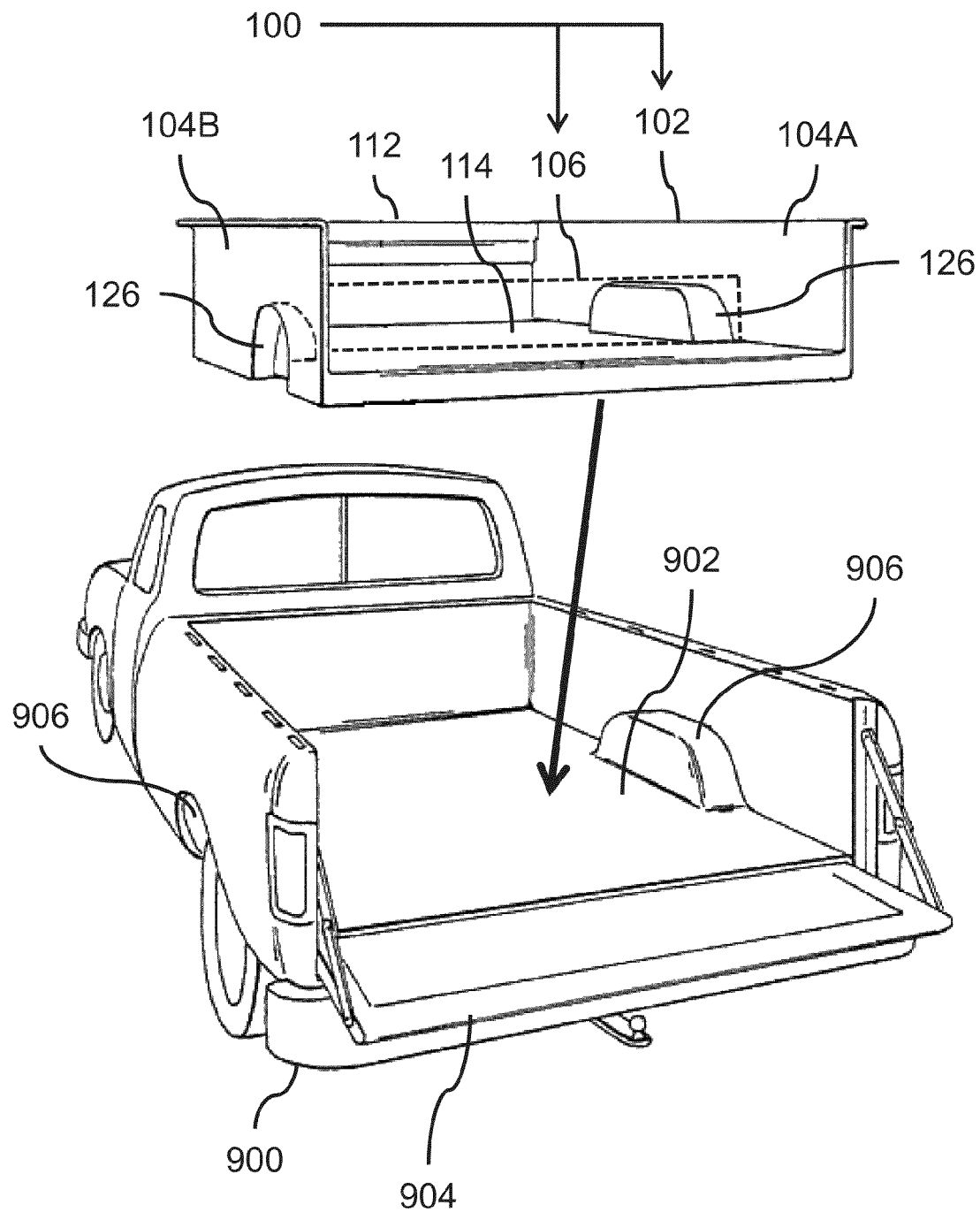
FIG. 1 (SHEET 1 of 14 SHEETS) depicts a view of an embodiment of an apparatus 100 for a vehicle 900 having a vehicle section 902.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS

100 apparatus
102 vehicle cargo liner assembly 104A oppositely-facing liner side walls, or side wall
104B oppositely-facing liner side walls, or side wall
106 movable liner panel
106A first movable liner panel
106B second movable liner panel
108 panel-storage position
110 panel-deployed position
112 back wall assembly
114 floor assembly
116 pivot assembly
116A first pivot assembly
116B second pivot assembly
118A first latch assembly
118B second latch assembly
120A direction path
120B direction path
120C direction path
120D direction path
124 cover assembly
126 wheel well section
127 wheel well notch
128 latch handle
130 torsion spring assembly
132 lateral sides
134 front section
136 rear section
138 panel channel
138A first panel channel
138B second panel channel
140 liner assembly
900 vehicle
902 vehicle section
904 tail gate
906 wheel wells
908 truck bed

DETAILED DESCRIPTION OF THE
NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a view of an embodiment of an apparatus 100 for a vehicle 900 having a vehicle section 902. Specifically, FIG. 1 depicts a rear perspective view of the apparatus 100 positioned above the vehicle 900 (in a ready position to be installed to the vehicle 900).

The apparatus 100 includes (and is not limited to) a vehicle cargo liner assembly 102 and a movable liner panel 106. The vehicle cargo liner assembly 102 is of the drop-in type bed liner (that is, the vehicle cargo liner assembly 102 is inserted or dropped into the vehicle 900). The apparatus 100 provides an improved arrangement for facilitating cargo to stay in place once received in the vehicle cargo liner assembly 102. When the vehicle 900 is driven over rough terrain, the cargo held in the vehicle cargo liner assembly 102 is less likely to become inadvertently damaged because of unintended shifting of the cargo in the vehicle cargo liner assembly 102. The vehicle cargo liner assembly 102 reduces, at least in part, the possibility of inadvertent shifting of the cargo once the cargo is received on the truck-bed liner. In order to achieve this, the vehicle cargo liner assembly 102 used the movable liner panel 106.

The vehicle cargo liner assembly 102 is configured to be received in the vehicle section 902 of the vehicle 900. The vehicle cargo liner assembly 102 has oppositely-facing liner side walls 104A, 104B. The oppositely-facing liner side walls 104A, 104B are hereafter referred to as the side wall 104A and the side wall 104B. The vehicle cargo liner assembly 102 is configured to receive cargo items (for example). The vehicle cargo liner assembly 102 also includes a back wall assembly 112 that spans across and between the side wall 104A and the side wall 104B (and is positioned at the rear portion of the vehicle cargo liner assembly 102). The vehicle cargo liner assembly 102 also includes a floor assembly 114. The side wall 104A, the side wall 104B and the back wall assembly 112 all extend upwardly (substantially vertically) from the floor assembly 114. The side wall 104A, the side wall 104B, the back wall assembly 112, and the floor assembly 114 are formed or configured to provide a cargo space (for storing cargo in the vehicle 900). The vehicle cargo liner assembly 102 may be formed (molded) from a plastic material (and any equivalent thereof).

In view of the foregoing, it will be appreciated that there is a method associated with the apparatus 100. The method is for the vehicle 900 having the vehicle section 902. The method includes a providing operation, including providing the vehicle cargo liner assembly 102 configured to be received in the vehicle section 902 of the vehicle 900, in which the vehicle cargo liner assembly 102 has oppositely-facing liner side walls 104A, 104B. The method further includes a mounting operation, including pivotally mounting the movable liner panel 106 pivotally to the oppositely-facing liner side walls 104A, 104B. This is done in such a way that the movable liner panel 106 is pivotally movable, at least in part, between a panel-storage position 108 and a panel-deployed position 110.

In view of the foregoing, it will be appreciated that there is also provided another aspect of the apparatus 100. In accordance with this aspect, the apparatus 100 includes (and is not limited to) the combination of the vehicle 900, the vehicle cargo liner assembly 102, and the movable liner panel 106. The vehicle 900 has the vehicle section 902. The vehicle cargo liner assembly 102 is configured to be received in the vehicle section 902 of the vehicle 900, in which the vehicle cargo liner assembly 102 has oppositely-facing liner side walls 104A, 104B. The movable liner panel 106 is pivotally mountable to the oppositely-facing liner side walls 104A, 104B. This is done in such a way that the movable liner panel 106 is pivotally movable, at least in part, between a panel-storage position 108 and a panel-deployed position 110.

The movable liner panel 106 is pivotally mountable to the oppositely-facing liner side walls 104A, 104B. This is done in such a way that the movable liner panel 106 is pivotally movable, at least in part, between a panel-storage position 108 (depicted in FIGS. 2A, 2C and 2E) and a panel-deployed position 110 (depicted in FIGS. 2B, 2D and 2F).

By way of an embodiment (and not limited thereto), the apparatus 100 is adapted in such as what that the vehicle cargo liner assembly 102 includes a truck-bed liner having a wheel well section 126 positioned on opposite sides of the vehicle cargo liner assembly 102 (at the side wall 104A and the side wall 104B). The vehicle 900 includes a pickup truck (or truck) having a tail gate 904, and wheel wells 906 positioned on opposite sides of the vehicle 900. The vehicle section 902 includes a rear open bed section as well. The wheel well section 126 is configured to interface with the wheel wells 906 of the vehicle 900. The vehicle section 902 includes a rear open-top flat-bed cargo area or cargo section (otherwise known as a bed). It will be appreciated that the apparatus 100 may be installed to any type (make or model) of the vehicle 900 where room exists on or in the vehicle 900 sized to (configured to) receive and support the apparatus 100 (and any items or cargo items to be received in the apparatus 100).

FIGS. 2A, 2B, 2B-1, 2C, 2D, 2E, 2F, 2G and 2H depict views of embodiments of the apparatus 100 of FIG. 1. By way of example (and not limited thereto), for these embodiments of the apparatus 100, the vehicle cargo liner assembly 102 may be usable (deployed) as a long-version truck-bed liner (to fit rear truck beds that are relatively longer in length). Specifically, there are two instances of the movable liner panel 106 deployed with the vehicle cargo liner assembly 102 (for these embodiments).

Figure 2A:
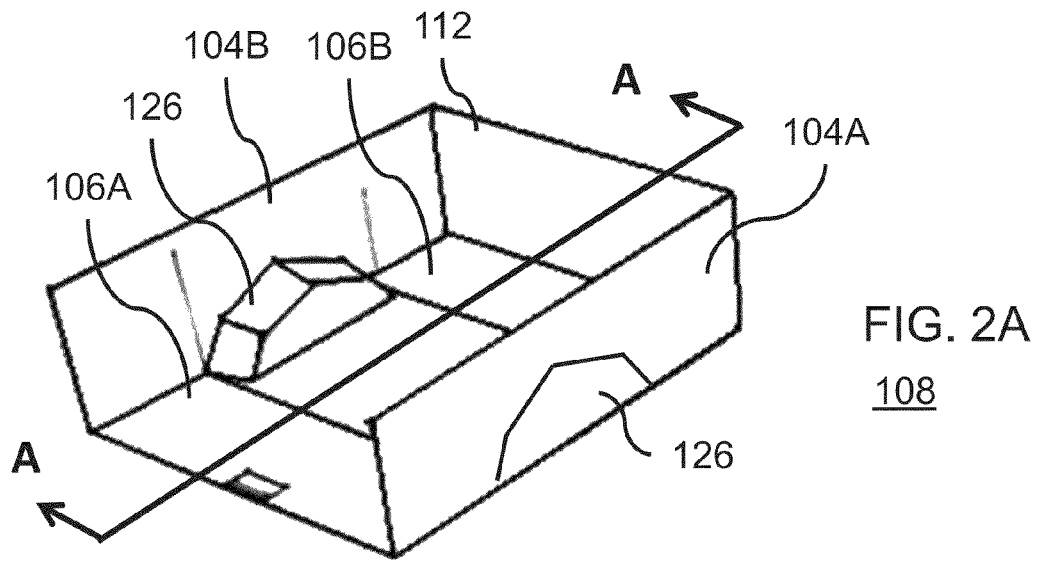
Figure 2B:
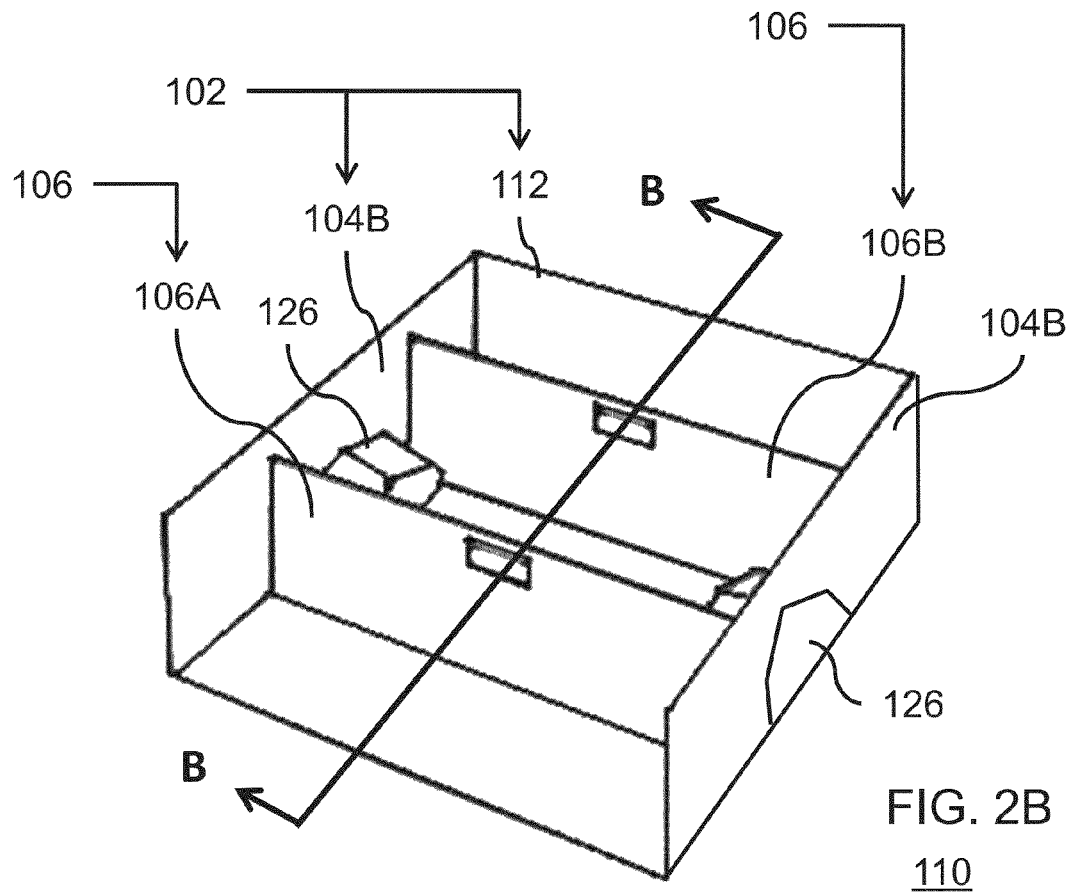
Figures 1, 2B:
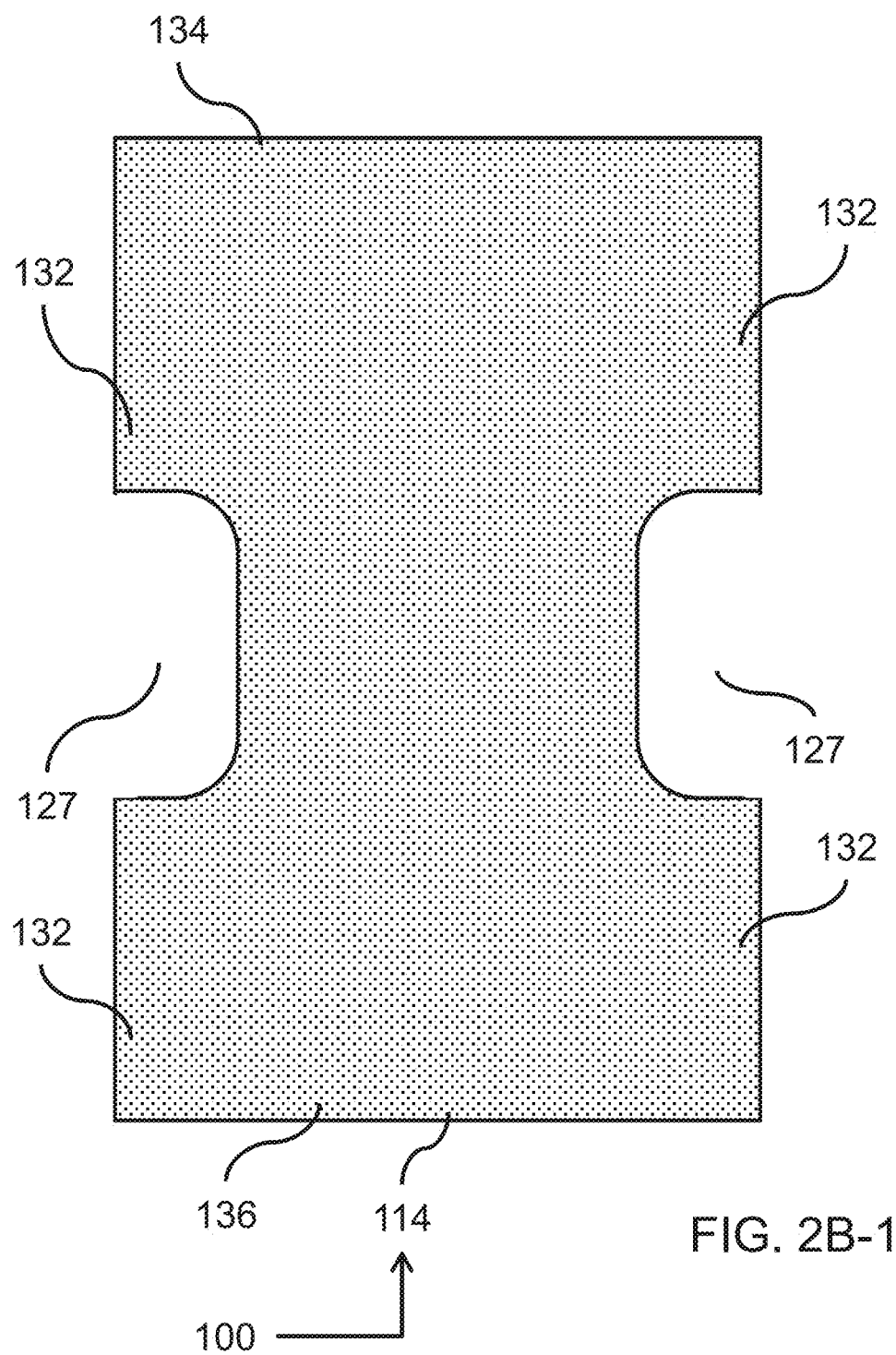

Specifically, FIG. 2A and FIG. 2B depict perspective rear views of embodiments of the apparatus 100. FIG. 2B-1 depicts a top view of an embodiment of the apparatus 100. FIG. 2C and FIG. 2D depict cross-sectional views of embodiments of the vehicle cargo liner assembly 102 of the apparatus 100 taken through the line A-A of FIG. 2A and the line B-B of FIG. 2B (respectively). The side wall 104A and the side wall 104B of the vehicle cargo liner assembly 102 are not depicted in FIGS. 2C and 2D. FIGS. 2E, 2F, 2G and 2H depict perspective rear views of embodiments of the apparatus 100 installed to the vehicle 900.

Referring to the embodiments of FIGS. 2A, 2C and 2E, the apparatus 100 is depicted in the panel-storage position 108. Referring to the embodiments of FIGS. 2B, 2D and 2F, the apparatus 100 is depicted in the panel-deployed position 110.

Referring to the embodiments of FIGS. 2A to 2F, the movable liner panel 106 includes a first movable liner panel 106A and also includes a second movable liner panel 106B spaced apart from the first movable liner panel 106A.

Referring to the embodiments of FIGS. 2A to 2F, the first movable liner panel 106A includes a first pivot assembly 116A. The first movable liner panel 106A includes a first latch assembly 118A. The second movable liner panel 106B includes a second pivot assembly 116B. The first movable liner panel 106A includes a second latch assembly 118B. The first pivot assembly 116A and the second pivot assembly 116B includes, by way of a specific embodiment, a hinge or a piano hinge, a pin assembly, etc., and any equivalent.

Referring to the embodiment of FIG. 2C, in the panel-storage position 108, the first movable liner panel 106A is moved to abut (at least in part) the floor assembly 114 and is aligned horizontally. In the panel-storage position 108 (depicted in FIG. 2C), the second movable liner panel 106B is moved to abut (at least in part) the floor assembly 114 and is aligned horizontally. In the panel-deployed position 110, the first movable liner panel 106A is aligned vertically. In the panel-deployed position 110, the second movable liner panel 106B is aligned vertically.

Referring to the embodiments of FIGS. 2A to 2F, the first pivot assembly 116A is configured to permit pivotal movement (rotational movement) of the first movable liner panel 106A between the panel-storage position 108 (depicted in FIG. 2C) and the panel-deployed position 110 (depicted in FIG. 2D). In the panel-storage position 108 (depicted in FIG. 2C), the first movable liner panel 106A is movable along the first up direction path 120A.

Referring to the embodiments of FIGS. 2A to 2F, the second pivot assembly 116B is configured to permit pivotal (rotational) movement of the second movable liner panel 106B between the panel-storage position 108 and the panel-deployed position 110. In the panel-storage position 108 (depicted in FIG. 2C), the second movable liner panel 106B is movable along the second up direction path 120B.

Referring to the embodiment depicted in FIG. 2D, in the panel-deployed position 110, the first movable liner panel 106A is movable along the first down direction path 120C. The first pivot assembly 116A is configured to pivotally couple the first movable liner panel 106A to the side wall 104A (as depicted in FIGS. 2A and 2B). In the panel-deployed position 110, the second movable liner panel 106B is movable along the second down direction path 120D. The second pivot assembly 116B is configured to pivotally couple the second movable liner panel 106B to the side wall 104B (as depicted in FIGS. 2A and 2B).

Referring to the embodiments of FIGS. 2A to 2F, in accordance with an option, the first movable liner panel 106A includes a first latch assembly 118A. The first latch assembly 118A is configured to operatively latch the first movable liner panel 106A in any one of the panel-storage position 108 and/or the panel-deployed position 110. In this manner, the first movable liner panel 106A may be securely (fixedly) kept at the panel-storage position 108 and/or the panel-deployed position 110.

Referring to the embodiments of FIGS. 2A to 2F, in accordance with an option, the second movable liner panel 106B includes a second latch assembly 118B. The second latch assembly 118B is configured to operatively latch the second movable liner panel 106B in any one of the panel-storage position 108 and/or the panel-deployed position 110. In this manner, the second movable liner panel 106B may be securely (fixedly) kept at the panel-storage position 108 and/or the panel-deployed position 110.

Referring to the embodiment depicted in FIG. 2B-1, the floor assembly 114 defines a wheel well notch 127 positioned on opposite lateral sides 132 of the floor assembly 114. The wheel well notch 127 is also positioned between the opposite end sections (that is, the front section 134 and the rear section 136, respectively) of the floor assembly 114. It will be appreciated that the first movable liner panel 106A and the second movable liner panel 106B are not depicted in FIG. 2B-1 (for the sake of convenient depiction of the floor assembly 114).

Referring to the embodiments depicted in FIG. 2G and FIG. 2H, the apparatus 100 further includes a cover assembly 124 configured to be positioned on a top section of the vehicle cargo liner assembly 102. This is done in such a way that the cover assembly 124 is moved to cover, at least in part, the interior of the vehicle cargo liner assembly 102 to prevent the ingress of unwanted elements (such as, rain, snow, dirt, etc.). The cover assembly 124 includes flat panel sections that are pivotally attached to each other. This is done in such a way that a portion (or a section) of the cover assembly 124 may be pivotally moved to expose a section of the interior of the vehicle cargo liner assembly 102 that is contained or defined (at least in part) by the movable liner panel 106. As depicted, there are three sections of the cover assembly 124 that correspond to the sections defined by the instances of the movable liner panel 106 deployed in the apparatus 100.

FIGS. 3A, 3B, 3C, 3D and 3E depict views of embodiments of the apparatus 100 of FIG. 1. By way of example (and not limited thereto), for these embodiments of the apparatus 100, the vehicle cargo liner assembly 102 may be usable (deployed) as a short-version truck-bed liner. Specifically, there is one instance of the movable liner panel 106 deployed with the vehicle cargo liner assembly 102 (for these embodiments). Specifically, FIGS. 3A to 3E depict perspective rear views of the apparatus 100.

Figure 3A:
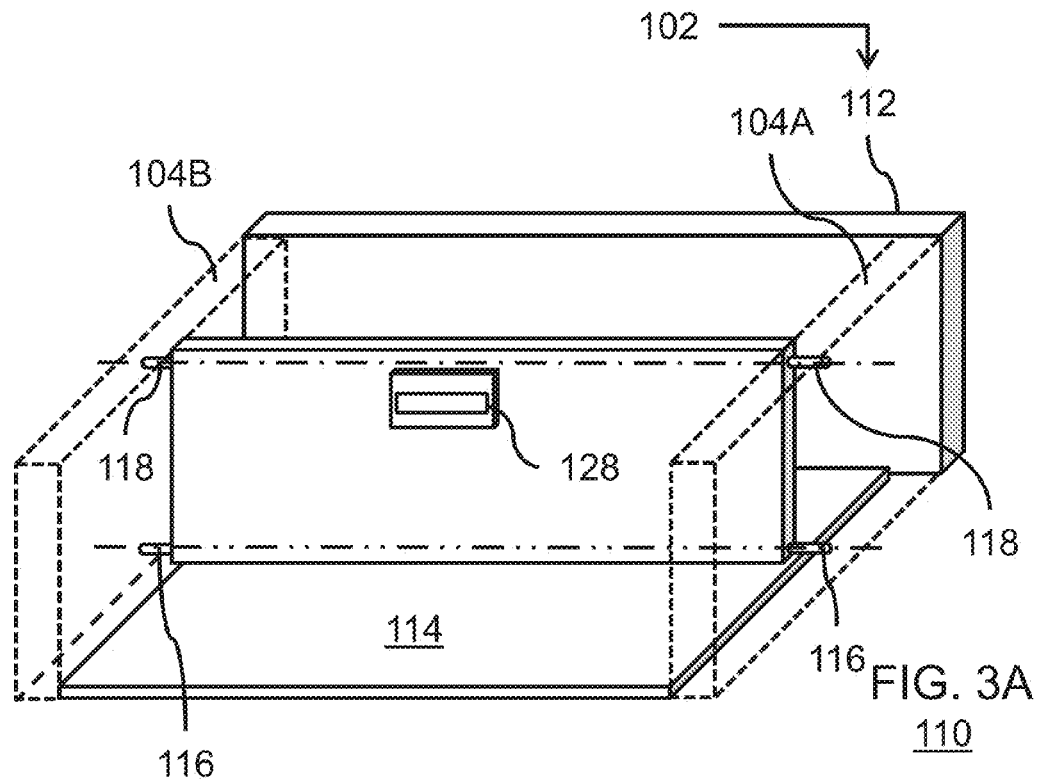
FIGS. 3A, 3B, 3C, 3D and 3E (SHEETS 7 to 9 of 14 SHEETS) depict views of embodiments of the apparatus 100 of FIG. 1.
Figure 3B:
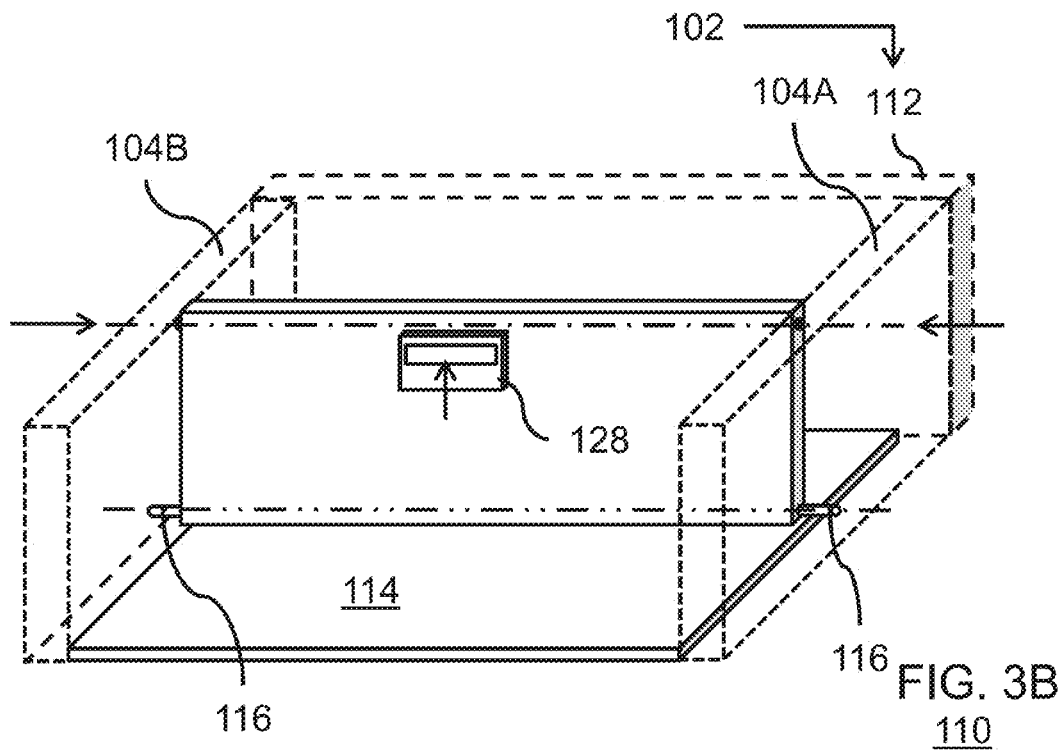
Figure 3C:
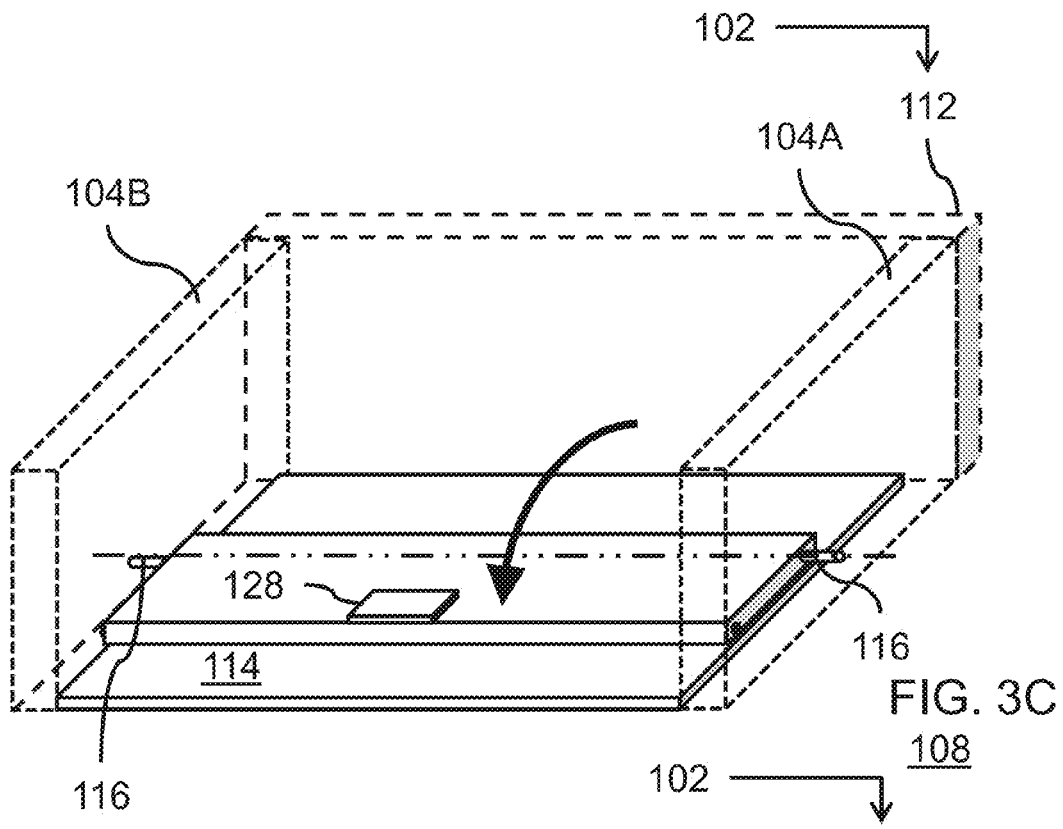
Figure 3D:
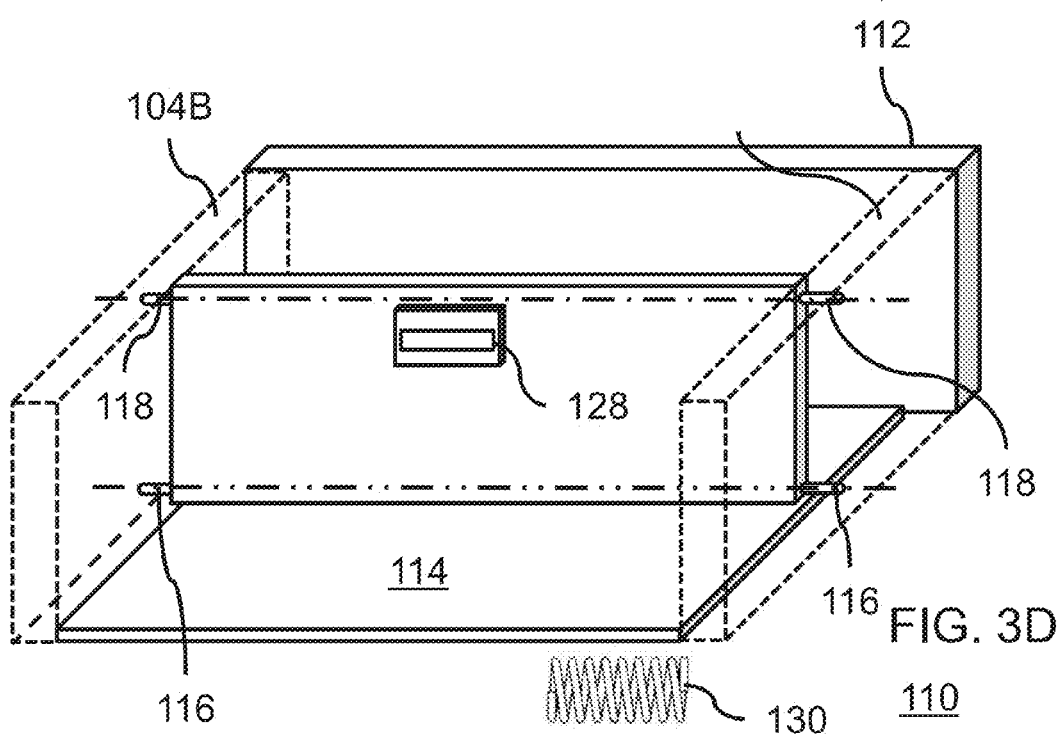
Figure 3E:
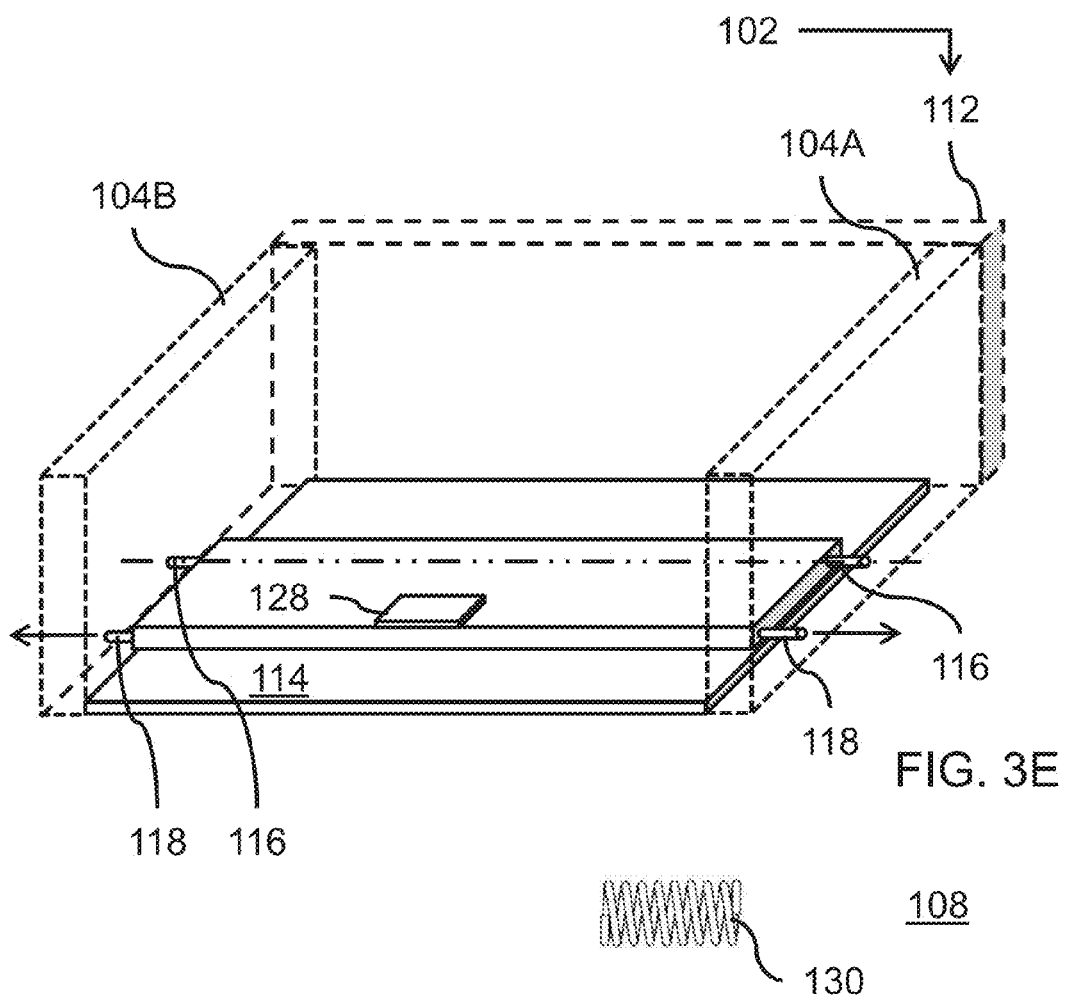

The panel-storage position 108 is depicted in FIGS. 3C, 3D and 3E. The panel-deployed position 110 is depicted in FIGS. 3A and 3B.

Referring to the embodiment depicted in FIG. 3A, the apparatus 100 further includes a latch handle 128. The latch handle 128 is configured to selectively latch the movable liner panel 106 to the side wall 104A and the side wall 104B (in response to operation by a user). The movable liner panel 106 is depicted in the panel-deployed position 110, and the movable liner panel 106 is latched to the side wall 104A and the side wall 104B. This is done in such a way that there is no relative movement between the movable liner panel 106 and the side wall 104A and the side wall 104B. The movable liner panel 106, once positioned in the panel-deployed position 110, forms storage areas (cargo areas) on opposite sides of the movable liner panel 106 within the interior of the vehicle cargo liner assembly 102.

Referring to the embodiment depicted in FIG. 3B, the latch handle 128 is operated in such a way that the movable liner panel 106 becomes de-latched (uncoupled) from the side wall 104A and the side wall 104B. In this manner, the movable liner panel 106 is now ready to me pivotally moved from the panel-deployed position 110 (the vertical position depicted in FIG. 3B) to the panel-storage position 108 (the horizontal position depicted in FIG. 3C). The user may manipulate movement of the movable liner panel 106, or more simply the user may release the movable liner panel 106 (once the movable liner panel 106 is uncoupled) and gravity pulls the movable liner panel 106 to the panel-storage position 108 depicted in FIG. 3C.

Referring to the embodiment depicted in FIG. 3C, the movable liner panel 106 is placed in the panel-storage position 108, and remains unlatched with the side wall 104A and the side wall 104B. It will be appreciated that in accordance with an option, the movable liner panel 106 is latched to the side wall 104A and the side wall 104B (once actuated by the latch handle 128). In this manner, the movable liner panel 106 may remain in a secured stored position within the interior of the vehicle cargo liner assembly 102.

Referring to the embodiments depicted in FIGS. 3D and 3E, the apparatus 100 further includes a torsion spring assembly 130. The torsion spring assembly 130 is positioned on (or proximate to) the pivot assembly 116. The torsion spring assembly 130 is configured to interact with the movable liner panel 106 and the side wall 104A and/or the side wall 104B. Once the movable liner panel 106 has become latched with the side wall 104A and/or the side wall 104B, the torsion spring assembly 130 cannot pivotally move the movable liner panel 106. The torsion spring assembly 130 is configured to provide pivoting force to the movable liner panel 106 once the movable liner panel 106 has become unlatched from the side wall 104A and the side wall 104B. For example, an instance of the torsion spring assembly 130 may be positioned at opposite sides of the movable liner panel 106 proximate to the side wall 104A and the side wall 104B. The torsion spring assembly 130 is configured to move the movable liner panel 106 (with assistance from the torsion spring assembly 130): (A) from the panel-storage position 108 depicted in FIG. 3E) to the panel-deployed position 110 (depicted in FIG. 3D) and/or (B) from the panel-deployed position 110 (depicted in FIG. 3D) to the panel-storage position 108 (depicted in FIG. 3E).

FIGS. 4A, 4B, 4C, 4D, 4E, 4F and 4G depict views of embodiments of the apparatus 100 of FIG. 1.

Figure 4A:
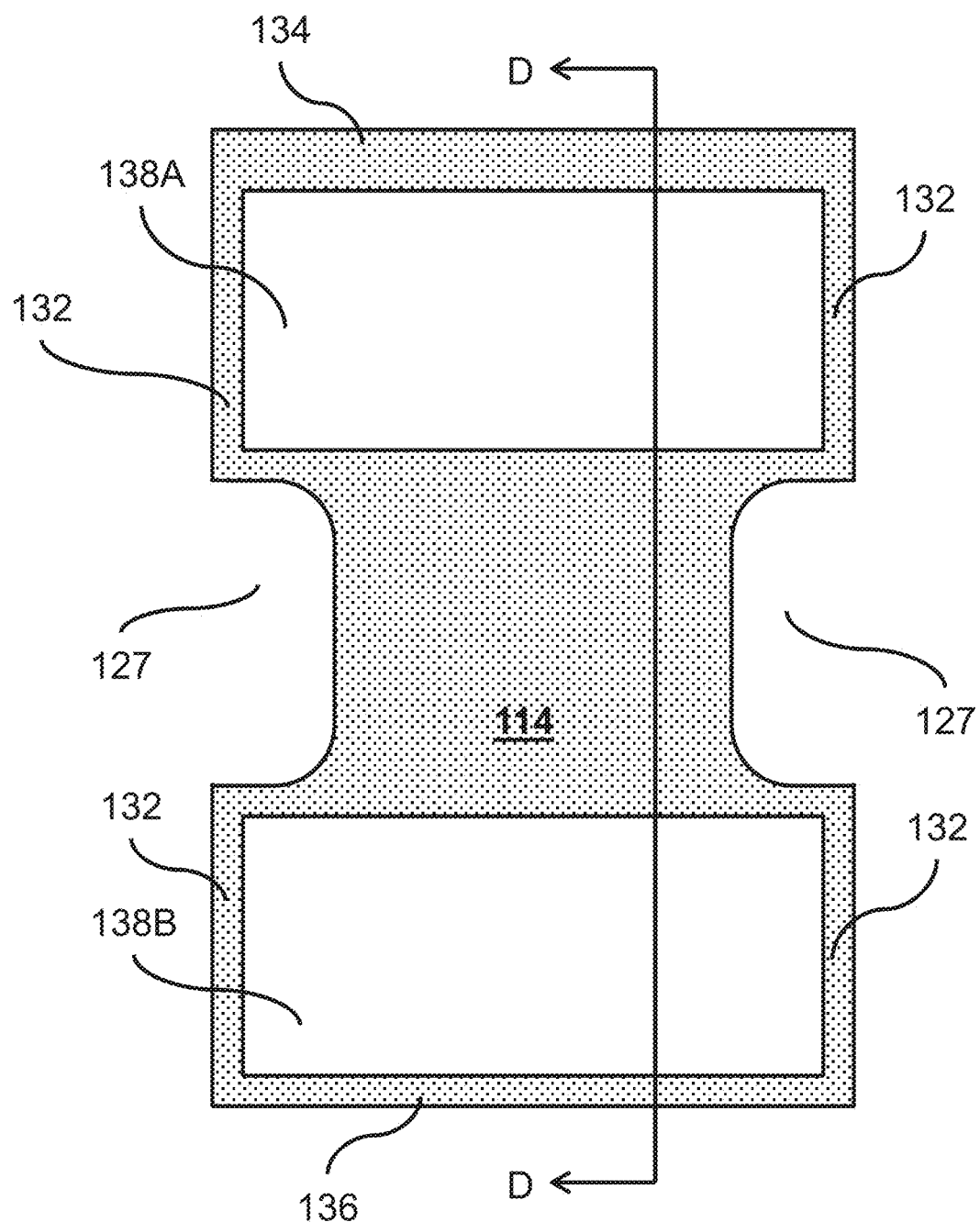
Figure 4B:
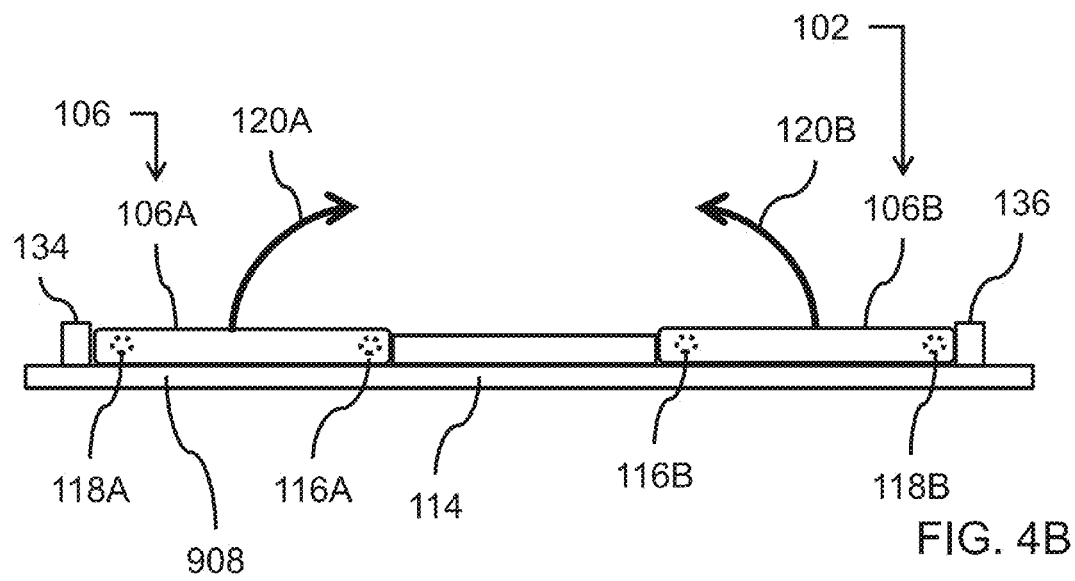
Figure 4C:
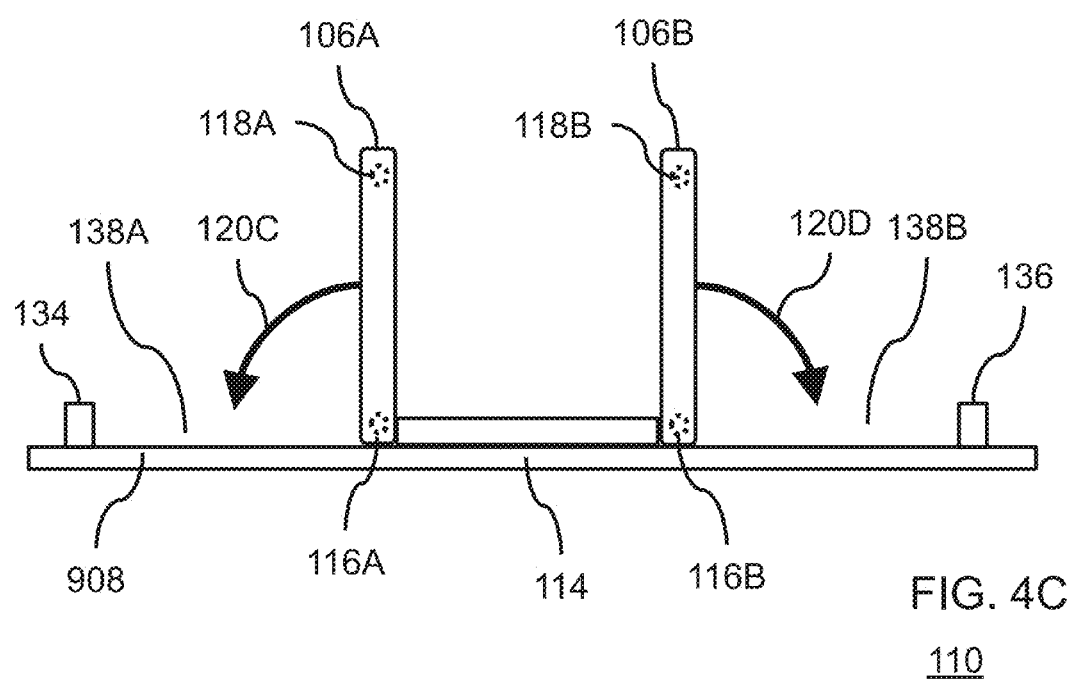
Figure 4E:
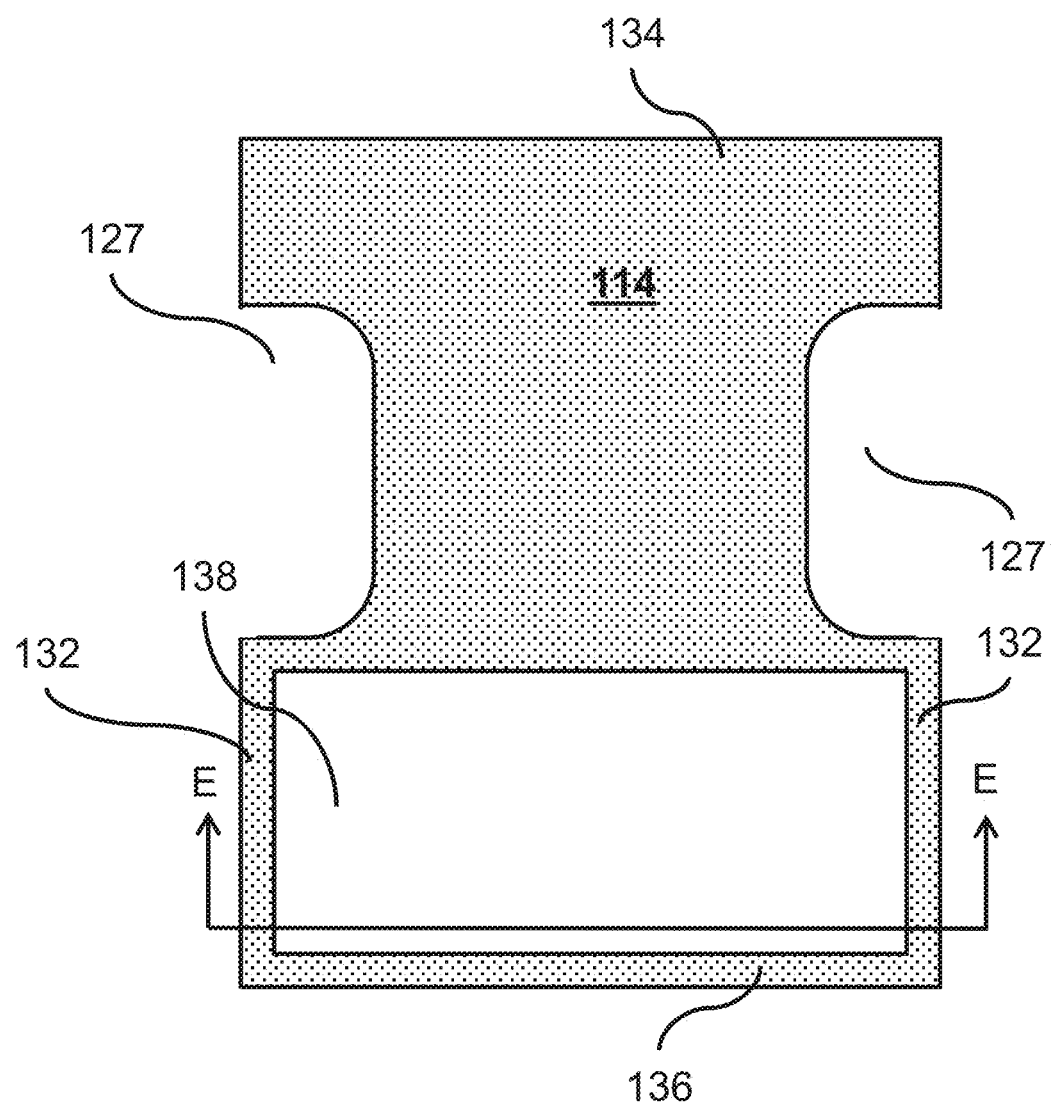
Figure 4F:
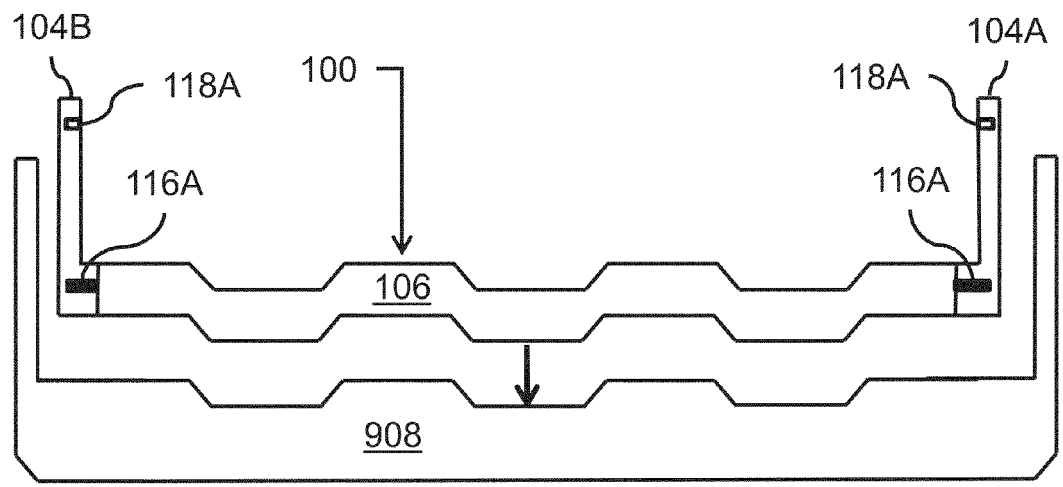
Figure 4G:
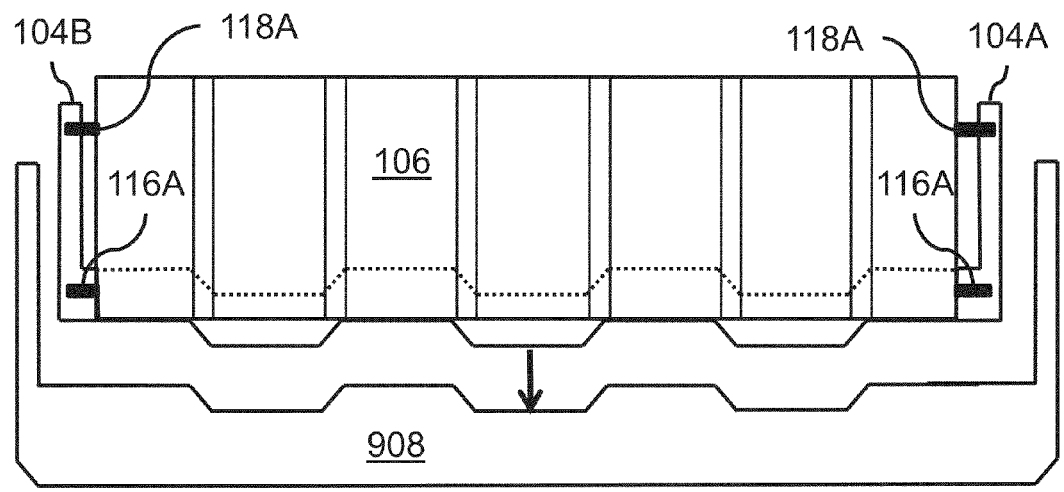

Specifically, FIGS. 4A and 4E depict top views, FIGS. 4B, 4C and 4D depict side views, and FIGS. 4G and 4G depict views end views.

Referring to the embodiment depicted in FIG. 4A, the floor assembly 114 is configured for deployment on or in a long bed version of the vehicle 900 (depicted in FIG. 1). The floor assembly 114 defines a wheel well notch 127 positioned on opposite lateral sides 132 of the floor assembly 114. The wheel well notch 127 is also positioned between the front section 134 and the rear section 136 of the floor assembly 114. It will be appreciated that the first movable liner panel 106A and the second movable liner panel 106B (as depicted in FIG. 2B) are not depicted in FIG. 4A (for the sake of convenient depiction of the floor assembly 114). The floor assembly 114 also defines a first panel channel 138A positioned at the front section 134. The first panel channel 138A is sized to receive the first movable liner panel 106A (depicted in FIG. 4C) in such a way that the first movable liner panel 106A is flush mounted to the floor assembly 114 once the first movable liner panel 106A is operatively received in the first panel channel 138A (as depicted in FIG. 4A). The floor assembly 114 also defines a second panel channel 138B positioned at the rear section 136. The second panel channel 138B is sized to receive the second movable liner panel 106B (depicted in FIG. 4C) in such a way that the second movable liner panel 106B is flush mounted to the floor assembly 114 once the second movable liner panel 106B is operatively received in the first panel channel 138A (as depicted in FIG. 4A).

Referring to the embodiments depicted in FIGS. 4A, 4B and 4C, side views of the floor assembly 114 is depicted through the line DD of FIG. 4A. The floor assembly 114 is placed (positioned) on the truck bed 908 of the vehicle 900 of FIG. 1.

Referring to FIG. 4C, the first panel channel 138A is sized to receive the first movable liner panel 106A (depicted in FIG. 4C) in such a way that the first movable liner panel 106A is flush mounted to the floor assembly 114 (as depicted in FIG. 4B) once the first movable liner panel 106A is operatively received in the first panel channel 138A (as depicted in FIG. 4A). The second panel channel 138B is sized to receive the second movable liner panel 106B (depicted in FIG. 4C) in such a way that the second movable liner panel 106B is flush mounted to the floor assembly 114 once the second movable liner panel 106B is operatively received in the first panel channel 138A (as depicted in FIG. 4A).

Referring to the embodiment depicted in FIG. 4D, a liner assembly 140 (such as a fabric, etc.) is received in the first panel channel 138A. The liner assembly 140 is also received in the second panel channel 138B. The liner assembly 140 is configured to protect the finish of the first movable liner panel 106A once the first movable liner panel 106A is received in the first panel channel 138A. The liner assembly 140 is configured to protect the finish of the second movable liner panel 106B once the second movable liner panel 106B is received in the second panel channel 138B. In addition, the liner assembly 140 is configured to protect the finish of the truck bed 908 once the first movable liner panel 106A is removed from the first panel channel 138A (as depicted in FIG. 4D). In addition, the liner assembly 140 is configured to protect the finish of the truck bed 908 once the second movable liner panel 106B is removed from the second panel channel 138B (as depicted in FIG. 4D).

Referring to the embodiment depicted in FIG. 4E, the floor assembly 114 is configured for deployment on or in a short bed version of the vehicle 900 (depicted in FIG. 1). The floor assembly 114 defines a panel channel 138. The panel channel 138 is sized to receive the movable liner panel 106 (depicted in FIGS. 4F and 4G) in such a way that the movable liner panel 106 is flush mounted to the floor assembly 114 once the movable liner panel 106 is operatively received in the panel channel 138.

Referring to the embodiments depicted in FIGS. 4F and 4G, there is depicted an end view of the apparatus 100 taken through the line EE of FIG. 4E. FIG. 4F depicts the panel-storage position 108. FIG. 4G depicts the panel-deployed position 110. The truck bed 908 of the vehicle 900 of FIG. 1 defines a corrugated outer surface. The movable liner panel 106 defines a corrugated outer surface that confirms to the shape of the corrugated outer surface of the truck bed 908. The corrugated outer surface of the movable liner panel 106 fits and contacts the corrugated outer surface of the truck bed 908 (once positioned to do just so). In accordance to the depicted embodiment, the bottom portion of the floor assembly 114 is shaped to confirm to the top portion of the truck bed 908 of the vehicle 900 (depicted in FIG. 1).

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly, or component that may be superior to any of the equivalents available to the person skilled in art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:
1. An apparatus for a vehicle having a rear open-top flat-bed cargo area, the apparatus comprising:
   a vehicle cargo liner assembly being configured to be received in the rear open-top flat-bed cargo area of the vehicle; and
   the vehicle cargo liner assembly being configured to: (A) be placed onto the rear open-top flat-bed cargo area of the vehicle, (B) shield an inner-side of the rear open-top flat-bed cargo area from damage once the vehicle cargo liner assembly is placed onto the rear open-top flat-bed cargo area, and (C) be removable from the rear open-top flat-bed cargo area; and
   the vehicle cargo liner assembly including:
   oppositely-facing liner side walls; and
   a movable liner panel being pivotally mountable to the oppositely-facing liner side walls in such a way that the movable liner panel is pivotally movable between a panel-storage position and a panel-deployed position; and
   a back wall assembly spanning across and between the oppositely-facing liner side walls and being positioned at a rear portion of the vehicle cargo liner assembly; and
   a floor assembly from which the oppositely-facing liner side walls and the back wall assembly extend upwardly therefrom, and the oppositely-facing liner side walls, the floor assembly and the back wall assembly being configured to provide a cargo space for storing cargo in the vehicle; and
   a wheel well section positioned on the oppositely-facing liner side walls, in which the wheel well section, in use, interfaces with the wheel wells of the vehicle; and
   the movable liner panel including:
      a first end section; and
      a second end section being spaced apart from the first end section; and
      a pivot assembly being positioned at and mounted to the first end section of the movable liner panel; and
      the pivot assembly being configured to permit pivotal movement of the movable liner panel between the panel-storage position and the panel-deployed position; and
      the pivot assembly also being configured to pivotally couple the movable liner panel to the oppositely-facing liner side walls at a position that is proximate to the floor assembly; and
      a first latch assembly being positioned at and mounted to the second end section of the movable liner panel; and
      the first latch assembly being spaced apart from the pivot assembly; and
      the first latch assembly being configured to operatively latch the movable liner panel in any one of the panel-storage position and the panel-deployed position so that the movable liner panel may be securely kept at any one of the panel-storage position and the panel-deployed position; and
      a latch handle being configured to selectively latch the movable liner panel to the oppositely-facing liner side walls in such a way that there is no relative movement between the movable liner panel and the oppositely-facing liner side walls, and the movable liner panel, in use, forms cargo areas on opposite sides of the movable liner panel within the interior of the vehicle cargo liner assembly.

2. The apparatus of claim 1, wherein:
the vehicle cargo liner assembly is formed from a plastic material.

3. The apparatus of claim 1, wherein:
the vehicle includes a pickup truck.

4. The apparatus of claim 1, wherein:
the movable liner panel includes:
 a first movable liner panel; and
 a second movable liner panel being spaced apart from the first movable liner panel.

5. The apparatus of claim 1, further comprising:
in the panel-storage position, the movable liner panel is moved to abut, at least in part, the floor assembly, and the movable liner panel is aligned horizontally.

6. The apparatus of claim 1, further comprising:
in the panel-deployed position, the movable liner panel is aligned vertically.

7. The apparatus of claim 1, further comprising:
a cover assembly being configured to be positioned on a top section of the vehicle cargo liner assembly in such a way that the cover assembly is moved to cover, at least in part, the interior of the vehicle cargo liner assembly to prevent ingress of unwanted elements.

8. The apparatus of claim 7, wherein:
the cover assembly includes flat panel sections pivotally attached to each other in such a way that a portion of the cover assembly is pivotally movable to expose a section of the interior of the vehicle cargo liner assembly that is defined, at least in part, by the movable liner panel.

9. The apparatus of claim 1, further comprising:
a latch handle being configured to selectively latch the movable liner panel to the oppositely-facing liner side walls in any one of the panel-storage position and the panel-deployed position.

10. The apparatus of claim 1, further comprising:
a torsion spring assembly being configured to interact with the movable liner panel and the oppositely-facing liner side walls.

11. The apparatus of claim 10, wherein:
the torsion spring assembly is configured to provide pivoting force to the movable liner panel once the movable liner panel has become unlatched from the oppositely-facing liner side walls.

12. An apparatus, comprising:
a vehicle having a rear open-top flat-bed cargo area;
a vehicle cargo liner assembly being configured to be received in the rear open-top flat-bed cargo area of the vehicle; and
the vehicle cargo liner assembly being configured to: (A) be placed onto the rear open-top flat-bed cargo area of the vehicle, (B) shield an inner-side of the rear open-top flat-bed cargo area from damage once the vehicle cargo liner assembly is placed onto the rear open-top flat-bed cargo area, and (C) be removable from the rear open-top flat-bed cargo area; and
the vehicle cargo liner assembly including:
oppositely-facing liner side walls; and
a movable liner panel being pivotally mountable to the oppositely-facing liner side walls in such a way that the movable liner panel is pivotally movable between a panel-storage position and a panel-deployed position; and
a back wall assembly spanning across and between the oppositely-facing liner side walls and being positioned at the rear portion of the vehicle cargo liner assembly; and
a floor assembly from which the oppositely-facing liner side walls and the back wall assembly extend upwardly therefrom, and the oppositely-facing liner side walls, the floor assembly and the back wall assembly being configured to provide a cargo space for storing cargo in the vehicle; and
a wheel well section positioned on the oppositely-facing liner side walls, in which the wheel well section, in use, interfaces with the wheel wells of the vehicle; and
the movable liner panel including:
 a first end section; and
 a second end section being spaced apart from the first end section; and
 a pivot assembly being positioned at and mounted to the first end section of the movable liner panel; and
 the pivot assembly being configured to permit pivotal movement of the movable liner panel between the panel-storage position and the panel-deployed position; and
 the pivot assembly also being configured to pivotally couple the movable liner panel to the oppositely-facing liner side walls at a position that is proximate to the floor assembly; and
 a first latch assembly being positioned at and mounted to the second end section of the movable liner panel; and
 the first latch assembly being spaced apart from the pivot assembly; and
 the first latch assembly being configured to operatively latch the movable liner panel in any one of the panel-storage position and the panel-deployed position so that the movable liner panel may be securely kept at any one of the panel-storage position and the panel-deployed position; and
 a latch handle being configured to selectively latch the movable liner panel to the oppositely-facing liner side walls in such a way that there is no relative movement between the movable liner panel and the oppositely-facing liner side walls, and the movable liner panel, in use, forms cargo areas on opposite sides of the movable liner panel within the interior of the vehicle cargo liner assembly.

\* \* \* \* \*